United States Patent
Rasmussen et al.

(10) Patent No.: US 9,847,833 B2
(45) Date of Patent: Dec. 19, 2017

(54) OPTICAL SIGNAL-TO-NOISE RATIO (OSNR) MONITORING AND MEASUREMENT IN OPTICAL COMMUNICATIONS SYTEMS

(71) Applicant: Acacia Communications, Inc., Maynard, MA (US)

(72) Inventors: Christian Rasmussen, Maynard, MA (US); Mehmet Aydinlik, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/738,769

(22) Filed: Jun. 12, 2015

(65) Prior Publication Data

US 2015/0365165 A1    Dec. 17, 2015

Related U.S. Application Data

(60) Provisional application No. 62/011,028, filed on Jun. 12, 2014.

(51) Int. Cl.
*H04B 10/077* (2013.01)
*H04B 10/079* (2013.01)

(52) U.S. Cl.
CPC ... *H04B 10/07953* (2013.01); *H04B 10/0775* (2013.01)

(58) Field of Classification Search
CPC ................................................ H04B 10/07953
See application file for complete search history.

(56) References Cited

U.S. PATENT DOCUMENTS

| | | | |
|---|---|---|---|
| 6,748,169 B1* | 6/2004 | Geiger | H04B 10/077 398/25 |
| 7,532,868 B1* | 5/2009 | Sapozhnykov | H04W 52/24 375/346 |
| 2003/0198253 A1* | 10/2003 | Ahmed | H04L 27/22 370/470 |
| 2010/0322622 A1* | 12/2010 | Shukunami | H04B 10/07953 398/26 |
| 2015/0155935 A1* | 6/2015 | Oda | H04B 10/07953 398/26 |
| 2016/0142134 A1* | 5/2016 | Pincemin | H04B 10/0775 398/26 |

* cited by examiner

*Primary Examiner* — Shi K Li
(74) *Attorney, Agent, or Firm* — Wolf, Greenfield & Sacks, P.C.

(57) ABSTRACT

Disclosed are methods for monitoring and measuring Optical Signal-To-Noise Ratios in optical communications systems. One exemplary method involves intentionally inserting zero power symbols into an optical signal stream such that those periods of time in which only zero power symbols are transmitted may be detected and compared with periods of time in which signals modulated with information including both signal and noise are detected such that the OSNR may be determined.

9 Claims, 4 Drawing Sheets

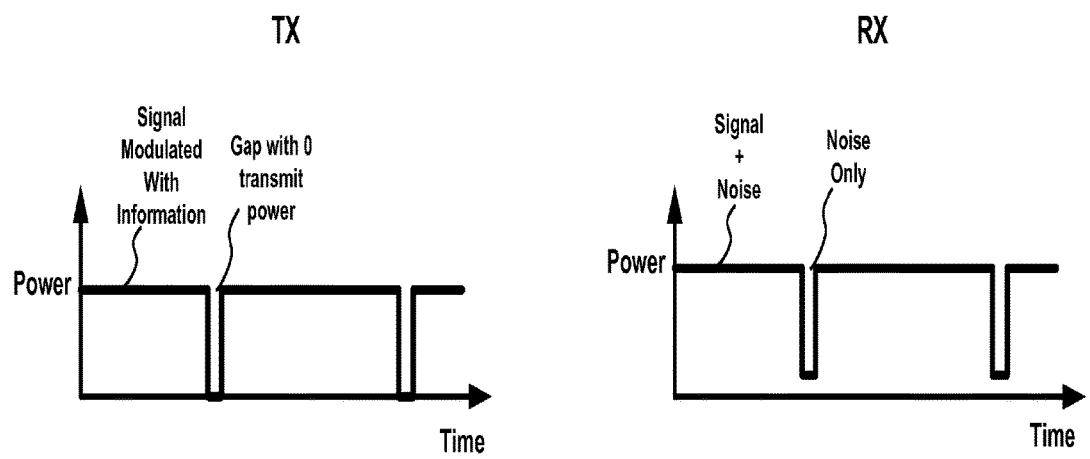
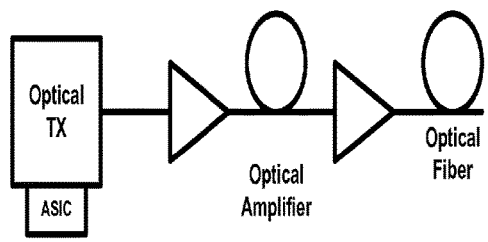
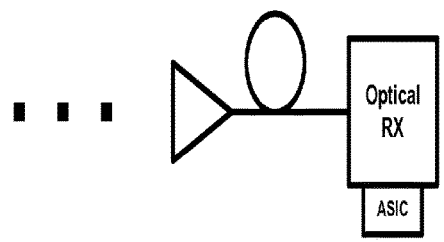
Figure 3(A)    Figure 3(B)

OPTICAL SIGNAL-TO-NOISE RATIO (OSNR) MONITORING AND MEASUREMENT IN OPTICAL COMMUNICATIONS SYTEMS

CROSS REFERENCE TO RELATED APPLICATIONS

This application claims the benefit of U.S. Provisional Patent Application Ser. No. 62/011,028 filed Jun. 12, 2014 which is incorporated by reference in its entirety as if set forth at length herein.

TECHNICAL FIELD

This disclosure relates generally to optical communications structures systems and methods. More particularly, this disclosure pertains to techniques, methods and apparatus for the monitoring of Optical Signal-To-Noise Ratio in optical communications systems.

BACKGROUND

Optical Signal-To-Noise Ratio (OSNR) is among the most important quantities measured in contemporary optical communications systems. Given its importance to these contemporary optical communications systems, techniques, methods and apparatus that facilitate or improve OSNR monitoring and measurement would represent a welcome addition to the art.

SUMMARY

An advance in the art is made according to an aspect of the present disclosure directed to the methods and apparatus that facilitate or improve OSNR measurement(s) in optical communications systems. More particularly, the present disclosure describes.

Briefly, one illustrative method according to the present disclosure More specifically, one exemplary method involves intentionally inserting zero power symbols into an optical signal stream such that those periods of time in which only zero power symbols are transmitted may be detected and compared with periods of time in which signals modulated with information including both signal and noise are detected such that the OSNR may be determined.

Advantageously, methods according to the present disclosure may be implemented in contemporary application specific integrated circuits (ASICs) operating in contemporary coherent optical systems.

BRIEF DESCRIPTION OF THE DRAWING

A more complete understanding of the present disclosure may be realized by reference to the accompanying drawing in which:

FIG. 3(A) shows a plot depicting optical power vs. time for an optical signal and a representative optical transmitter for illustrative methods according to the present disclosure;

FIG. 3(B) shows a plot depicting optical power vs. time for an optical and a representative optical receiver for illustrative methods according to the present disclosure;

DETAILED DESCRIPTION

Figure 1:
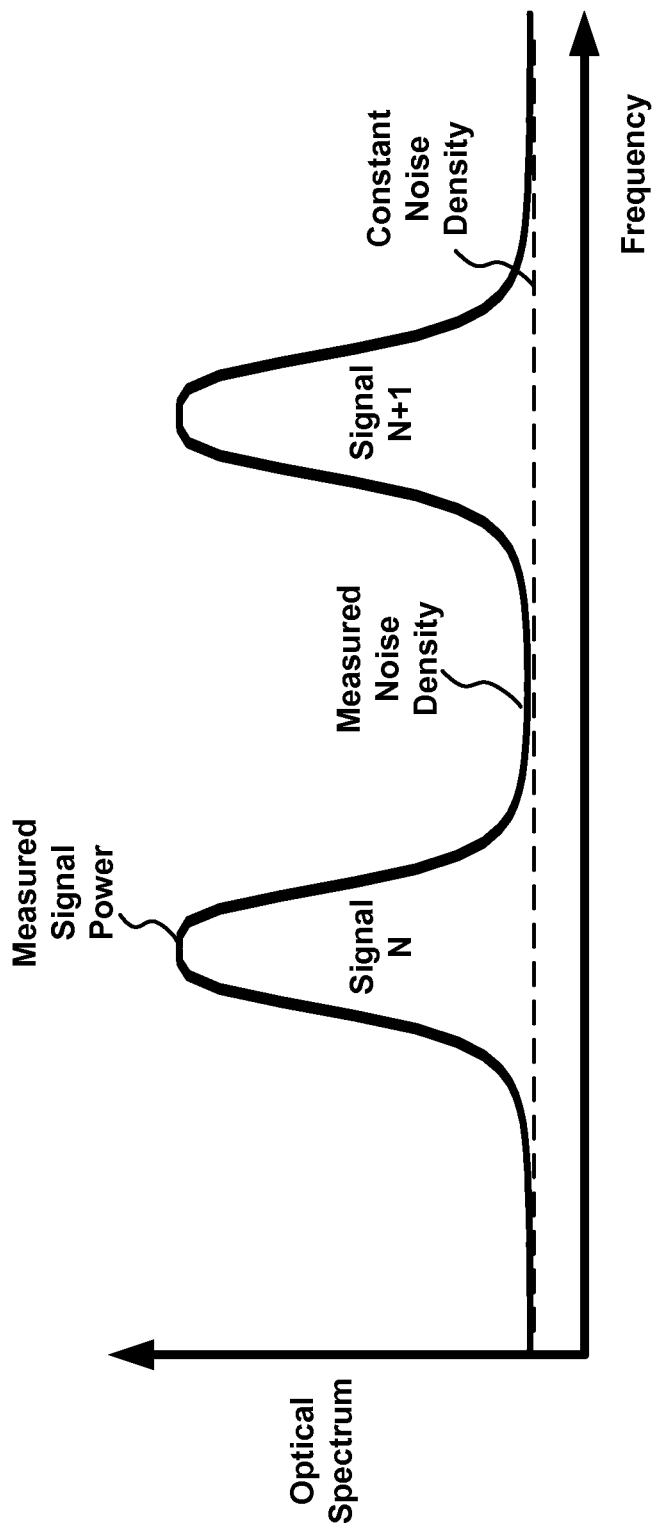
FIG. 1 shows a plot depicting optical spectrum vs. frequency for discussing illustrative prior art methods for measuring OSNR.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

We begin by noting that the optical signal to noise ratio is among the most important quantities to be monitored in fiber-optic communications systems to ensure a sufficiently high quality of service and determine any possible degradation of the system.

Those skilled in the art will readily appreciate that the OSNR describes a ratio between the power of a modulated optical carrier (which we refer to as the "signal") and the spectral density of the optical noise generated by optical amplifiers in the fiber-optic link. Historically, this noise density is quantified as the noise power in a fixed bandwidth of 12.5 GHz including both orthogonal polarizations of light supported by optical fiber comprising the fiber-optic link.

To better appreciate the historic determination of OSNR we now turn to FIG. 1, which shows a plot of optical spectrum vs. frequency. Shown in that plot is a solid line comprising two individual signal components namely, signal #N and signal #N+1 overlying a dotted line representing a constant noise density. As may be further appreciated by those skilled in the art, one can determine the measured noise density by examining that portion of the solid line between the two signals.

This traditional method for measuring OSNR as depicted in FIG. 1 relies on an assumption that the noise spectral density is constant over the bandwidth of the signal and that the optical signals in the same optical fiber have sufficient separation to enable determination of the noise spectral density by examining the optical spectrum between the signals.

Unfortunately, and as will be readily appreciated by those skilled in the art, this traditional method cannot be used in high spectral efficiency systems where the individual signals are positioned so close to one another that any spectral overlap and noise density cannot be observed between the signals.

Figure 2:
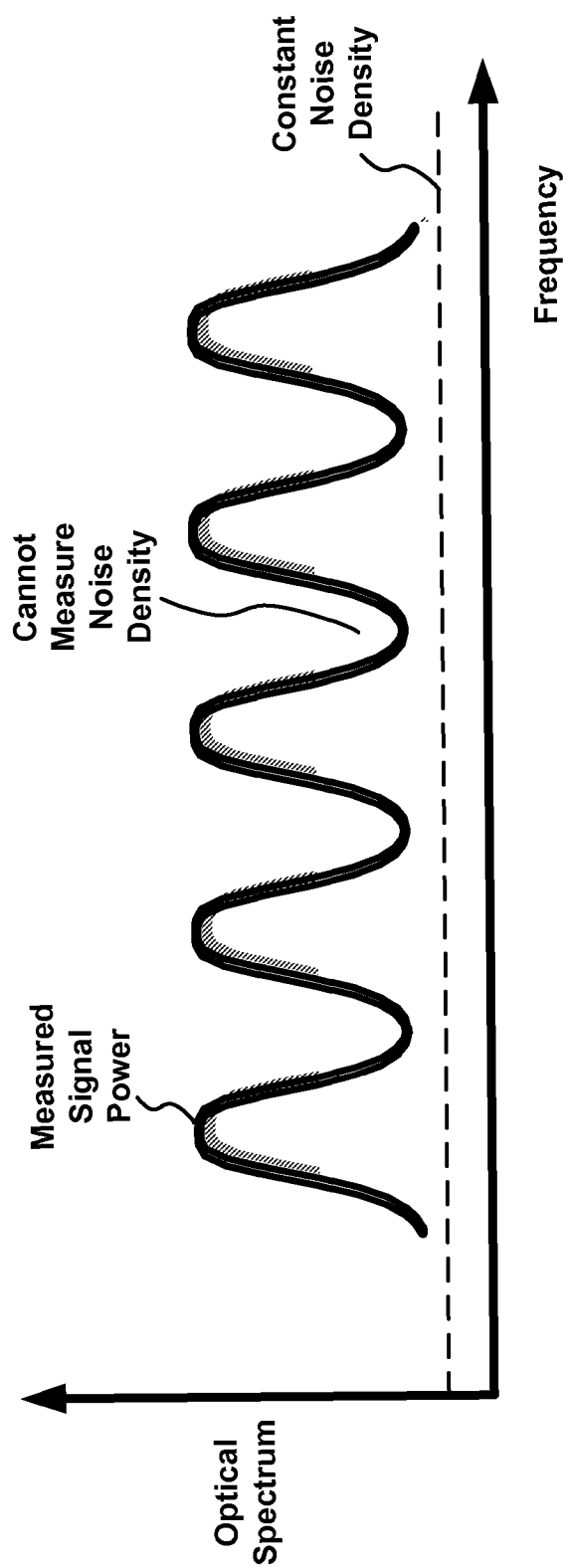
FIG. 2 shows an additional plot depicting optical spectrum vs. frequency for discussing illustrative prior art methods for measuring OSNR.

Such circumstance may be observed with reference to FIG. 2, which shows a plot of optical spectrum vs. frequency comprising a number of signals each exhibiting a measured signal power (shown as solid line). As with the plot shown in FIG. 1, the plot of FIG. 2 shows a constant noise density as a dotted line. As may be readily observed by those skilled in the art, since the individual signal components are positioned too close to one another, noise density cannot measured between the signals.

Notably, this traditional method can be extended to circumstances where one polarization mode of a signal carries the entire signal power. More specifically, optical power of an optical signal may be measured after the optical signal passes through a polarizer that only passes one polarization mode while suppressing the orthogonal polarization mode. If the polarization mode selected by the polarizer is varied, then the power transmitted through the polarizer varies as well.

As may be understood, the highest detected power is the power of the optical signal added to the power of any noise component having the same polarization as the signal. The lowest detected power is the power of the noise component having a polarization orthogonal to that of the signal. Assuming that the noise power in the two polarizations is the same, the ratio of the signal power to the total noise power may be estimated.

Unfortunately, even this extended method will fail if the signal is not polarized which is the case for many classes of contemporary communications systems—including those employing polarization multiplexed quadrature amplitude modulated signals (PM-QAM). For those optical signals having statistically independent information modulated on two polarization modes supported by an optical fiber, half of the total signal power and half of the total noise power is transmitted through the polarizer independently of polarization mode selected.

To enable OSNR measurement in all types of systems—including those systems exhibiting high spectral efficiency and polarization multiplexed signals, we describe a method according to the present disclosure in which a transmitted signal includes brief periods of time (typically sub nanosecond) where the instantaneous signal power is zero thereby allowing measurement of the time invariant noise power at a receiver. From a measurement of the total power at the receiver (signal+noise) and noise power only, a ratio of signal-to-noise power may be determined and OSNR may be determined after appropriate calibration for receiver bandwidth and other factors.

With simultaneous reference now to FIGS. 3(A) and 3(B) there it may be observed a schematic diagram illustrating a method according to the present disclosure as operating within the context of a contemporary optical communications system. More specifically, FIG. 3(A) depicts operation at a transmitter side of the optical communications system while FIG. 3(B) depicts operation at a receiver side of the optical communications system.

As will be appreciated, contemporary optical transmitters and receivers based on coherent transmission and digital signal processing employ specialized application specific integrated circuit(s) (ASICs) that provide digital modem functionality—among other functions. Advantageously, an OSNR measurement method according to the present disclosure may be implemented by such an ASIC within a transmitter or receiver—as appropriate.

With reference now to FIG. 3(A) there is shown a power vs. time plot for a signal modulated with information that may be transmitted by the optical transmitter and transmission system comprising one or more optical amplifiers and one or more spans of optical fiber. More specifically—and as shown in that figure, a number of zero power symbols may be inserted into an output of the transmitter wherein the number of zero power symbols are inserted in between a pair of signals that are modulated with information. Operationally, this insertion may be performed by an ASIC and the number of symbols may be—for example—around 10.

With reference to FIG. 3(B) one may similarly observe receiver side operation of a method according to the present disclosure. As depicted therein, a number of signals modulated with information are received wherein those modulated signals comprise both signal and noise components. Interspersed between adjacent signals, are periods or gaps wherein zero transmit power has been transmitted. As a result, such periods represent noise only.

As may be appreciated, at the receiver an ASIC may determine received average power (signal plus noise) and any optical line framing. Accordingly, periods exhibiting an absence of signal power namely, those periods during which zero power symbols were transmitted may be identified such that any noise power received in the absence of signal power may be determined.

In implementations involving an ASIC, such ASIC may advantageously perform any necessary digital link equalization to remove inter-symbol interference (ISI) that could otherwise alter the zero power measurement. More specifically, ISI may lead to power from neighboring information-carrying symbols "leaking" into time windows in which zero power symbols are transmitted thereby affecting noise power measurement. Additionally, such ASICs—or supporting firmware/software may apply any necessary calibration and subsequently determine OSNR of the fiber optic link.

As may be readily understood and appreciated by those skilled in the art, accuracy of our OSNR measurement method may be affected by fiber nonlinearities. In particular, power from information-carrying symbols may "scatter" into time windows during which zero power was transmitted (zero power symbols transmitted) due to any interaction of fiber nonlinearity and chromatic dispersion. Such scattering may lead to an overestimation of the noise power and consequently an underestimation of the OSNR.

Extending the duration of the windows of zero power transmission will reduce this effect however extending the duration too long may create undesired interactions in a transmission system. Notably, long zero power transmission periods may lead to undesired gain control of optical amplifiers. In illustrative implementations involving any of a variety of fiber types, signal power levels and zero power window durations, our analysis indicates that zero power windows exhibiting sub-ns duration enables OSNR estimation with an accuracy of 0.5 dB or better up to OSNR levels of about 200 dB for typical signal power levels in optical fiber thereby creating on the order of 1 dB transmission penalty due to fiber nonlinearities.

Figure 4:
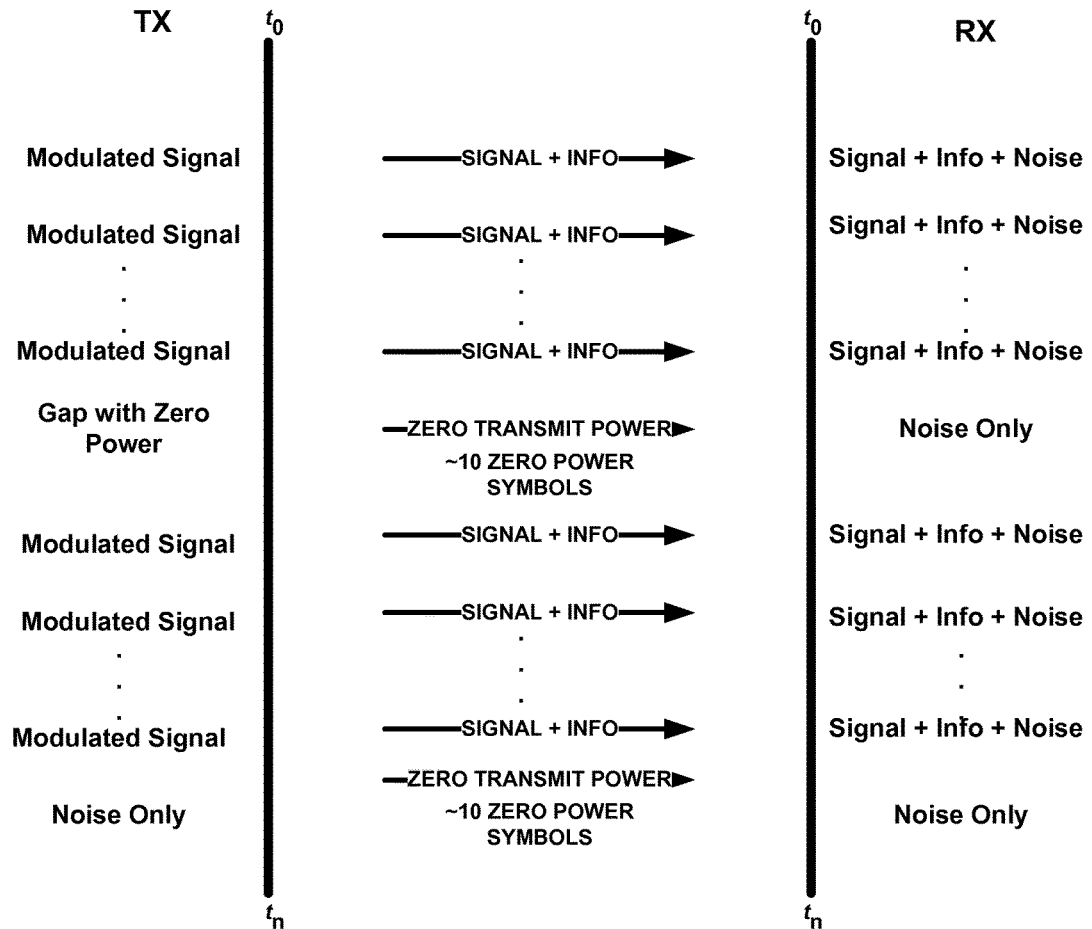
FIG. 4 shows a swim-lane diagram depicting the transmission and reception of from the perspective of a transmitter and a receiver according to an aspect of the present disclosure.

An overall understanding of a method according to the present disclosure may be further understood with respect to FIG. 4. There is shown a "swim-lane" diagram depicting the transmission and reception from time=$t_0$ until time=$t_n$ according to an aspect of the present disclosure. As may be observed from this figure, at a transmitter, a modulated signal is transmitted which includes signal+information. This transmission process is repeated for a period of time at which a gap with zero power is produced by the transmitter which as noted previously may comprise ~10 zero power symbols in particular systems. Following this "gap" another set of signal+information modulated signals are transmitted which in turn are followed by another gap. The process is repeated.

At a receiver, signal+info+noise is received corresponding to that transmitted. At certain periods of time, the gap comprising zero power signals is received which as noted previously provides a noise level. Accordingly, this constant noise level may be used to subsequently determine the noise component to the overall signal+info+noise received.

Notably, some estimation error(s) manifest themselves with all methods. This is due—in part—to additional noises resulting from implementation loss and other factors. Notwithstanding, we can calibrate an OSNR measurement in order to remove effect(s) of additional noise. The estimated SNR (ESNR) is given by $$ESNR = \frac{S^2}{2\sigma^2} = \frac{S^2}{2(\sigma_{ASE} + \sigma_{R_X})\sigma_{ASE}}$$

where
$\sigma_{ASE}^2$ denotes ASE noise;
$\sigma_{R_X}^2$ denotes additional noise; and
$S^2$ denotes signal power.
The OSNR is then given by:

$$OSNR_{db} = 10\log_{10}\left[\frac{S^2}{2\sigma_{ASE}^2}\right] + 10\log_{10}\left[\frac{B_{ref}}{R_S}\right]$$

$$= -10\log_{10}\left[\frac{1}{ESNR} - \frac{2\sigma_{R_X}^2}{S^2}\right] + \log_{10}\left[\frac{B_{ref}}{R_S}\right]$$

where $$\frac{2\sigma_{R_X}^2}{S^2}$$

is estimated through calibration. More particularly, successive determinations are made to record actual measured OSNR and ESNR estimate and use the above to generate this term.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A method, performed by an optical receiver coupled to an optical link, for measuring an optical signal-to-noise ratio (OSNR) of the optical link, the method comprising:
receiving, during a first contiguous period of time, an information-carrying signal comprising a modulated signal generated by an optical transmitter coupled to the optical link;
after receiving the information-carrying signal during the first period of time, receiving a noise signal during a second contiguous period of time that does not overlap with the first contiguous period of time, wherein instantaneous signal power of the optical transmitter is zero during the second contiguous period of time and wherein the second contiguous period of time is shorter than a nanosecond;
determining, from the information-carrying signal obtained during the first contiguous period of time, a measure of power of the information-carrying signal;
determining, from the noise signal obtained during the second contiguous period of time and without using the information-carrying signal obtained during the first contiguous period of time, a measure of power of the noise signal; and
determining the OSNR of the optical link using the measure of power of the information-carrying signal and the measure of power of the noise signal.

2. The method of claim 1, wherein inter-symbol interference is removed from the noise signal prior to determining the measure of power of the noise signal.

3. The method of claim 2, wherein the inter-symbol interference is removed by performing digital link equalization.

4. The method of claim 1, wherein determining the optical signal to noise ratio (OSNR) of the optical link comprises:
determining an estimated optical signal to noise ratio (ESNR) using the measure of power of the information-carrying signal and the measure of power of the noise signal; and
determining the OSNR based on the ESNR.

5. An optical receiver apparatus coupled to an optical link, the optical receiver apparatus comprising:
circuitry configured to determine optical signal to noise ratio (OSNR) of the optical link at least in part by:
receiving, during a first contiguous period of time, an information-carrying signal comprising a modulated signal generated by an optical transmitter coupled to the optical link;
after receiving the information-carrying signal during the first period of time, receiving a noise signal during a second contiguous period of time that does not overlap with the first contiguous period of time, wherein instantaneous signal power of the optical transmitter is zero during the second contiguous period of time and wherein the second contiguous period of time is shorter than a nanosecond;

determining, from the information-carrying signal obtained during the first contiguous period of time, a measure of power of the information-carrying signal;

determining, from the noise signal obtained during the second contiguous period of time and without using the information-carrying signal obtained during the first contiguous period of time, a measure of power of the noise signal; and determining the OSNR of the optical link using the measure of power of the information-carrying signal and the measure of power of the noise signal.

6. The optical receiver apparatus of claim 5, wherein the circuitry comprises an application-specific integrated circuit (ASIC).

7. The optical receiver apparatus of claim 5, wherein the circuitry is further configured to remove inter-symbol interference from the noise signal prior to determining the measure of power of the noise signal.

8. The optical receiver apparatus of claim 7, wherein the circuitry is configured to remove the inter-symbol interference by performing digital link equalization.

9. The optical receiver apparatus of claim 5, wherein determining the optical signal to noise ratio (OSNR) of the optical link comprises:

determining an estimated optical signal to noise ratio (ESNR) using the measure of power of the information-carrying signal and the measure of power of the noise signal; and determining the OSNR based on the ESNR.

* * * * *

UNITED STATES PATENT AND TRADEMARK OFFICE
CERTIFICATE OF CORRECTION

PATENT NO. : 9,847,833 B2
APPLICATION NO. : 14/738769
DATED : December 19, 2017
INVENTOR(S) : Christian Rasmussen et al.

It is certified that error appears in the above-identified patent and that said Letters Patent is hereby corrected as shown below:

On the Title Page

In item (54) and in the Specification, Column 1, Line 1, replace:
OPTICAL SIGNAL-TO-NOISE RATIO (OSNR) MONITORING AND MEASUREMENT IN OPTICAL COMMUNICATIONS SYTEMS With:
OPTICAL SIGNAL-TO-NOISE RATIO (OSNR) MONITORING AND MEASUREMENT IN OPTICAL COMMUNICATIONS SYSTEMS Signed and Sealed this
Tenth Day of April, 2018

Andrei Iancu
*Director of the United States Patent and Trademark Office*